US012695107B2

(12) United States Patent
Lee et al.

(10) Patent No.: US 12,695,107 B2
(45) Date of Patent: Jul. 28, 2026

(54) FUEL CELL SYSTEM AND CONTROL METHOD THEREOF

(71) Applicants: HYUNDAI MOTOR COMPANY, Seoul (KR); Kia Corporation, Seoul (KR)

(72) Inventors: Yong Hee Lee, Yongin-si (KR); Se Hoon Song, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 559 days.

(21) Appl. No.: 18/328,130

(22) Filed: Jun. 2, 2023

(65) Prior Publication Data

US 2024/0266576 A1 Aug. 8, 2024

(30) Foreign Application Priority Data

Feb. 7, 2023 (KR) ........................ 10-2023-0016222

(51) Int. Cl.
| | |
|---|---|
| *H01M 8/22* | (2006.01) |
| *H01M 8/0438* | (2016.01) |
| *H01M 8/04746* | (2016.01) |
| *H01M 8/2404* | (2016.01) |

(52) U.S. Cl.
CPC ......... *H01M 8/222* (2013.01); *H01M 8/0438* (2013.01); *H01M 8/04753* (2013.01); *H01M 8/2404* (2016.02)

(58) Field of Classification Search
CPC .. H01M 8/222; H01M 8/2404; H01M 8/0438; H01M 8/04753

USPC ................................... 429/90, 400, 504, 512
See application file for complete search history.

(56) References Cited

U.S. PATENT DOCUMENTS

| | | | |
|---|---|---|---|
| 8,007,945 B2 * | 8/2011 | Miyata .............. | H01M 8/04179 429/429 |
| 8,211,579 B2 * | 7/2012 | Igarashi ........... | H01M 8/04559 429/513 |
| 8,383,277 B2 * | 2/2013 | Tezuka ............... | H01M 8/1007 429/400 |
| 8,603,690 B2 * | 12/2013 | Burch ............... | H01M 8/04014 429/408 |
| 9,093,679 B2 | 7/2015 | Morita et al. | |

(Continued)

FOREIGN PATENT DOCUMENTS

| | | | | |
|---|---|---|---|---|
| DE | 10 2011 083 327 A1 | 3/2012 | | |
| JP | 2004022487 A * | 1/2004 | ............. | H01M 8/04 |

(Continued)

OTHER PUBLICATIONS

Extended European Search Report dated Jul. 9, 2024, issued in corresponding European Patent Application No. 23176910.0.

*Primary Examiner* — Patricia L. Hailey
(74) *Attorney, Agent, or Firm* — MORGAN, LEWIS & BOCKIUS LLP

(57) ABSTRACT

Fuel cell systems and methods of controlling the fuel cell system are provided, where the fuel cell system includes a fuel cell stack including an anode and a cathode, a nitrogen tank configured to store nitrogen drained from the cathode, and to supply the stored nitrogen to the anode, and a controller configured to control the store and the supply of the nitrogen, based on one or more of a pressure and a filling amount of the nitrogen tank.

12 Claims, 8 Drawing Sheets

(56)　　　　　References Cited

U.S. PATENT DOCUMENTS

| | | | |
|---|---|---|---|
| 2011/0250516 A1* | 10/2011 | Tsukada ............ | H01M 8/04302 |
| | | | 429/513 |
| 2012/0077102 A1 | 3/2012 | Morita et al. | |
| 2020/0243884 A1* | 7/2020 | Itoga ................. | H01M 8/04932 |

FOREIGN PATENT DOCUMENTS

| | | | | | |
|---|---|---|---|---|---|
| KR | 10-2007-0098072 A | | 10/2007 | | |
| KR | 20070098072 A | * | 10/2007 | ............... | F16L 3/02 |
| WO | WO-2024056717 A2 | * | 3/2024 | ........ | H01M 8/04231 |

* cited by examiner

FUEL CELL SYSTEM AND CONTROL METHOD THEREOF

CROSS-REFERENCE TO RELATED APPLICATION

This application claims the benefit under 35 USC § 119(a) of Korean Patent Application No. 10-2023-0016222, filed in the Korean Intellectual Property Office on Feb. 7, 2023, the entire disclosure of which is incorporated herein by reference for all purposes.

BACKGROUND

1. Field

The following description relates to a fuel cell system and a control method thereof.

2. Discussion of Related Art

A fuel cell system may generate electrical energy using a fuel cell stack. For example, when hydrogen is used as the fuel of a fuel cell stack, hydrogen may be an alternative for a global environment problem. Accordingly, studies and researches for the fuel cell system have consecutively been performed.

The fuel cell system may include a fuel cell stack that generates electrical energy, a fuel supply device that supplies fuel (hydrogen) to the fuel cell stack, an air supply device that supplies oxygen, which serves as an oxidizing agent necessary for an electrochemical reaction, to the fuel cell stack, and a thermal management system (TMS) that removes reaction heat from the fuel cell stack, controls the operating temperature of the fuel cell stack, and performs a water management function.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a fuel cell system including a fuel cell stack including an anode and a cathode, a nitrogen tank configured to store nitrogen drained from the cathode, and to supply the stored nitrogen to the anode, and a controller configured to control the storing of the nitrogen and the supplying of the nitrogen, based on one or more of a pressure and a filling amount of the nitrogen tank.

The nitrogen tank may include an input valve and an output valve, and wherein the controller may be configured to control opening or closing of the input valve and the output valve to control the store and the supply of the nitrogen.

The controller may be configured to open the input valve and to close the output valve, in response to a first condition being satisfied during a lower-output operation of the fuel cell stack, and to close the input valve and the output valve, in response to the first condition not being satisfied.

The first condition may be at least one of the filling amount of the nitrogen tank being less than a first value, or the pressure of the nitrogen tank being equal to or less than a pressure of the cathode.

The controller may be configured to open the input valve and to close the output valve, in response to the second condition being satisfied during a higher-power operation of the fuel cell stack, and close the input valve and the output valve, in response to the second condition not being satisfied.

The second condition may be at least one of the filling amount of the nitrogen tank being less than a second value, or the pressure of the nitrogen tank being equal to or less than the pressure of the cathode.

The controller may be configured to open the input valve and close the output valve, in response to the pressure of the nitrogen tank being less than a third value after an operation of the fuel cell stack is terminated, and close the input valve and the output valve, in response to the pressure of the nitrogen tank being equal to or greater than the third value.

The controller may be configured to open the output valve, in response to a first time elapsing after the operation of the fuel cell stack is terminated and after the input valve is closed.

The controller may be configured to control to close the output valve and to enter into a power saving mode, in response to a pressure drop of the nitrogen tank being stopped.

The controller may be configured to open the output valve, in response to a second time being elapsed without the operation of the fuel cell stack, after entering into the power saving mode.

In another general aspect, there is provided a processor-implemented method of controlling a fuel cell system including a fuel cell stack including an anode and a cathode, the method including storing nitrogen drained from the cathode in a nitrogen tank, and supplying the stored nitrogen to the anode, determining pressure and a filling amount of the nitrogen tank, and controlling the storing and the supplying of the nitrogen, based on one or more of the pressure and the filling amount of the nitrogen tank.

The nitrogen tank may include an input valve and an output valve, and wherein the controlling of the storing and the supplying of the nitrogen may include controlling opening and closing of the input valve and the output valve to control the storing and the supplying of the nitrogen.

Other features and aspects will be apparent from the following detailed description, the drawings, and the claims.

Figure 1:
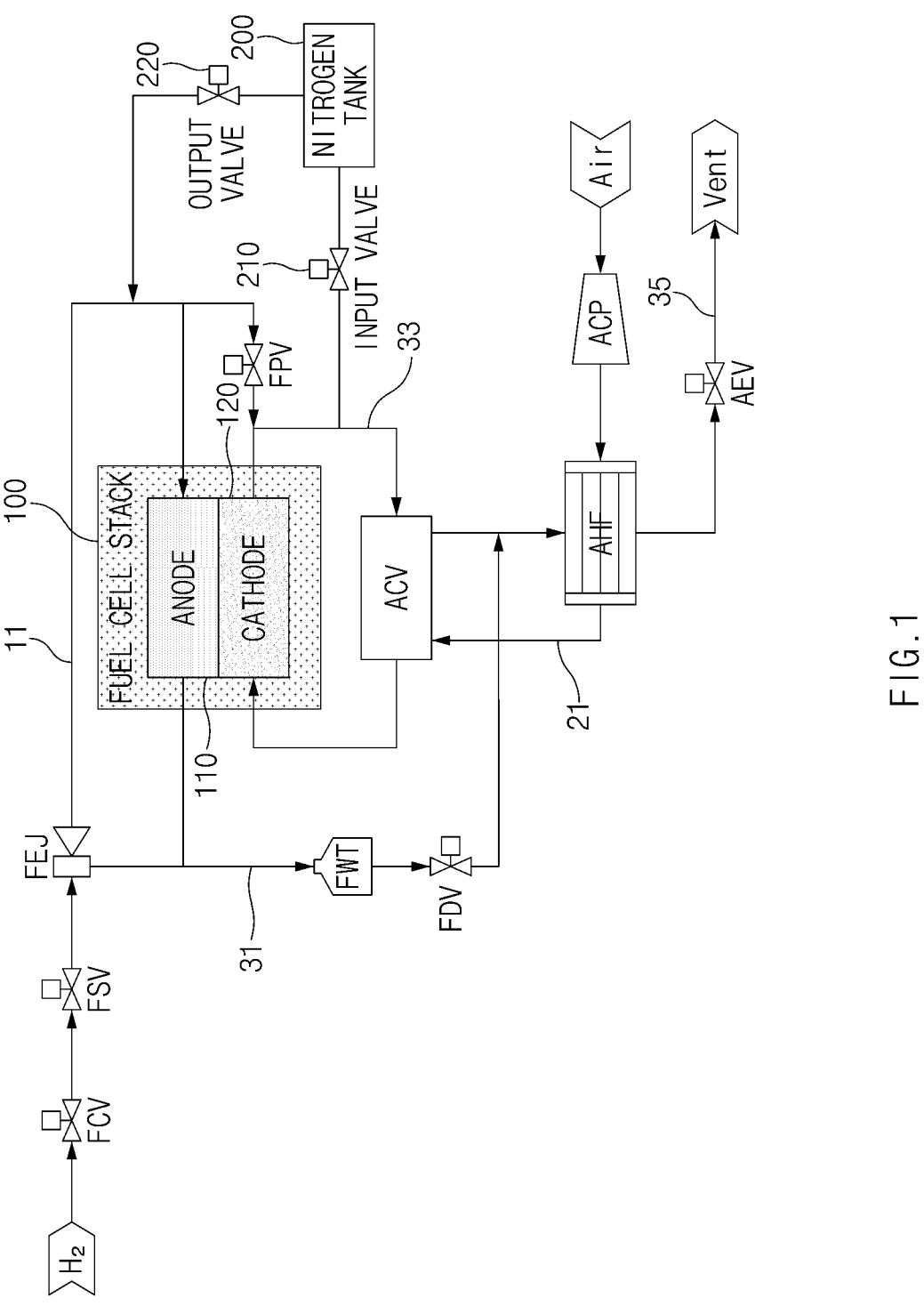
FIG. 1 is a view illustrating the structure of a fuel cell system, according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Each component (e.g., the module or the program) of the above-described components described in the present disclosure may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform one or more functions of each component of the plurality of components in the manner same as or similar to being performed by the corresponding component of the plurality of components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The term "module" or "part" used in the disclosure may include a unit implemented in hardware, software, or firmware and may be, for example, interchangeably used with the terms "logic", "logical block", "part" and "circuit". The "module" may be a minimum unit of an integrated part or may be a part thereof. For example, according to an embodiment, the "module" may be implemented in the form of an application-specific integrated circuit (ASIC).

Various embodiments of the disclosure may be implemented by software (e.g., program or application) including at least one instruction stored in a storage medium (e.g., a memory) readable by a machine. For example, the processor of the device may call at least one instruction of one or more instructions from the storage medium and may execute the at least one instruction. This allows the machine to run to perform at least one function according to the at least one instruction, which is called. The one or more instructions may include a code generated by a compiler or a code executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

FIG. 1 is a view illustrating the structure of a fuel cell system, according to an embodiment of the present disclosure.

Referring to FIG. 1, the fuel cell system may include a fuel cell stack 100, and may further include a hydrogen supply line 11 linked to an anode 110 of the fuel cell stack 100 to transfer hydrogen to be supplied to the fuel cell stack 100, an air supply line 21 linked to a cathode 120 of the fuel cell stack 100 to transfer air to be supplied to the fuel cell stack 100, and drain lines 31, 33, and 35 and a purge line to drain moisture (water) and unreacted gas, which are reaction byproducts to the outside.

The fuel cell stack 100 (or may be referred to as a 'fuel cell') may be formed in a structure for generating electricity through an oxidation-reduction reaction between fuel (e.g., hydrogen) and an oxidizing agent (e.g., air).

For example, the fuel cell stack 100 may include a membrane electrode assembly (MEA) having catalyst electrode layers attached to opposite sides of an electrolyte membrane for transferring hydrogen ions, a gas diffusion layer (GDL) to uniformly distribute reaction gases and transfer the generated electrical energy, a gasket and clamping mechanism to maintain airtightness and proper clamping pressure of reaction gases and cooling water, and a bipolar plate to transfer the reaction gases and the cooling water.

In the fuel cell stack 100, the hydrogen serving as fuel and the air (oxygen) serving as the oxidizing agent may be supplied to the anode and the cathode of the MEA through a fluid passage of the bipolar plate. For example, the hydrogen may be supplied to the anode 110 and the air may be supplied to the cathode 120.

Hydrogen supplied to the anode is decomposed into hydrogen ions and electrons by catalysts in the electrode layers formed on opposite sides of the electrolyte membrane. Only the hydrogen ions among the hydrogen ions and electrons pass through the electrolyte membrane serving as a cation exchange membrane and are transferred to the cathode. Simultaneously, the electrons may be transferred to the cathode through the gas diffusion layer serving as a conductor and the bipolar plate. In the cathode, the hydrogen ions supplied through the electrolyte membrane and the electrons received through the bipolar plate meet oxygen of the air supplied to the cathode through an air supply device, thereby generating water. In this case, the electrons may be introduced through an external conductive line due to the transfer of the hydrogen ions, and the introduction of the electrons may generate a current.

A Fuel Cut-Off Valve (FCV), a Fuel Supply Valve (FSV), and a Hydrogen Ejector (FEJ) may be disposed on the hydrogen supply line 11. In addition, for example, the hydrogen supply line 11 may be linked to a hydrogen tank.

The FCV may be interposed between the hydrogen tank and the FSV on the hydrogen supply line 11, thereby blocking hydrogen drained from the hydrogen tank from being supplied to the fuel cell stack 100. The FCV may be controlled to be open in a start-On state of the fuel cell system, and controlled to be closed in a start-Off state of the fuel cell system.

The FSV may be interposed between the FCV and the FEJ on the hydrogen supply line 11 to adjust the pressure of hydrogen supplied from the fuel cell stack 100. For example, when the pressure of the hydrogen supply line 11 is reduced, the FSV may be controlled to be open to supply hydrogen. When the pressure of the hydrogen supply line 11 is increased, the FSV may be controlled to be closed.

The FEJ may be interposed between the FSV and the fuel cell stack 100 on the hydrogen supply line 11 to apply pressure to the hydrogen output from the FSV such that hydrogen is supplied to the fuel cell stack 100.

The hydrogen supply line 11 may link an outlet of the fuel cell stack 100 to the FEJ to form a circulation loop of the hydrogen. Accordingly, the hydrogen drained from the FEJ reacts with the air in the fuel cell stack 100 to generate electrical energy, and non-reacted hydrogen may be drain through the outlet of the fuel cell stack 100 and re-introduced into the FEJ In this case, the non-reacted hydrogen may be re-introduced into the FEJ and supplied to the fuel cell stack 100, thereby increasing the reaction efficiency of the hydrogen.

In the process of re-circulating hydrogen, which is not reacted at the anode 110 of the fuel cell stack 100, the moisture existing in the hydrogen supply line 11 may be condensed. In this case, the condensed water may be drained through a first drain line 31 linking a point on the hydrogen supply line 11 to transfer, to the FEJ, the non-reacted hydrogen at the anode 110 of the fuel cell stack 100, with an air humidifier (AHF).

A fuel water trap FWT and a fuel drain valve FDV may be disposed on a first drain line 31.

The FWT may serve to store the condensed water introduced into the first drain line 31 from the one point of the hydrogen supply line 11.

The FDV may serve to drain the condensed water, which is stored in the FWT, to the AHF along the first drain line 31. In this case, the FDV is closed until the water level of the condensed water stored in the FWT exceeds a specific water level. When the water level of the condensed water stored in the FWT exceeds the specific water level, the FDV may be controlled to be open such that the condensed water is drained along the first drain line 31.

An air compressor (ACP), a humidifier (AHF), and an air cut-off valve (ACV) may be disposed on the air supply line 21.

The ACP may be interposed between an air inlet, which sucks ambient air, and the AHF on the air supply line 21 to suck and compress the ambient air and to supply the compressed air.

The AHF may be interposed between the ACP and the ACV on the air supply line 21 to adjust the humidity of the air sucked and compressed by the ACP such that the compressed air is supplied to the cathode 120 of the fuel cell stack 100. When the air compressed by the ACP is introduced into the inlet of the AHF, the AHF may supplies moisture to the introduced air such that the humidity is adjusted. For example, the AHF may apply moisture to the air supplied from the ACP by using the condensed water introduced through the first drain line 31, or moisture included in the air drained through the second drain line 33 linking the cathode 120 of the fuel cell stack 100 with the AHF.

The AHF may be linked to the first drain line 31. Accordingly, the AHF may supply moisture to air supplied from the ACP by using condensed water introduced through the first drain line 31.

In addition, the AHF may be linked to the air outlet of the fuel cell stack 100 through the second drain line 33, and air drained from the cathode 120 of the fuel cell stack 100 may be introduced into the AHF through the second drain line 33. Here, since air drained from the cathode 120 of the fuel cell stack 100 contains moisture, the AHF may apply moisture by exchanging moisture between the air drained from the cathode 120 of the fuel cell stack 100 and the air supplied from the ACP. As described above, the air supplied with moisture by the AHF may be introduced into the cathode 120 of the fuel cell stack 100 to react with hydrogen and then generate water as a reactant.

Meanwhile, the AHF may be linked to an external outlet through the third drain line 35, and air introduced through the second drain line 33 may be drained to the outside through the third drain line 35. In this case, an air exhaust valve (AEV) may be disposed on the third drain line 35.

The ACV may be disposed on the air supply line 21 linking the fuel cell stack 100 to the AHF, to block hydrogen drained from the AHF from being supplied to the cathode 120 of the fuel cell stack 100, or to adjust the pressure of air supplied to the cathode 120 of the fuel cell stack 100. For example, the ACV may be controlled to be open in a start-On state of the fuel cell system, and controlled to be closed in a start-Off state of the fuel cell system.

In addition, the ACV may be linked to the second DRAIN line 33 linking the fuel cell stack 100 to the AHF. The ACV may block the supply of air drained from the cathode 120 of the fuel cell stack 100 to the AHF through the second drain line 33, or may adjust the pressure of the air drained from the cathode 120 of the fuel cell stack 100 to the AHF.

Although FIG. 1 illustrates that the ACV is integrally disposed on the air supply line 21 and the second drain line 33, a first ACV (not illustrated) disposed on the air supply line 21 may be implemented to be separated from a second ACV (not illustrated) disposed on the second drain line 33.

Meanwhile, the purge line may be linked to one point on the hydrogen supply line 11 to transfer hydrogen, which is supplied from the FEJ to the anode 110 of the fuel cell stack 100, and a fuel-line purge valve (FPV) may be disposed on the purge line.

The FPV is a valve that is open and closed to manage hydrogen concentrations in the fuel cell stack 100 and the hydrogen supply line 11 to be maintained in a specific range.

The fuel cell stack 100 may generate electrical energy by using hydrogen and air. While the fuel cell stack 100 is driven in a normal state, the FPV may be closed.

In this case, the air supplied to the fuel cell stack 100 includes nitrogen in addition oxygen. In this case, cross-over may be caused due to the difference in partial nitrogen pressure between the anode 110 and the cathode 120 to decrease a cell voltage. Accordingly, the FPV increases the hydrogen concentration in the anode 110 by draining the residual hydrogen to decrease a nitrogen concentration, such that stack performance is maintained. The FPV may be controlled to be open to purge hydrogen, such that the hydrogen concentration in the anode 110 is maintained to be a specific amount or more, when an accumulated current calculated by integrating a current generated during a specific period exceeds a target value in the fuel cell stack 100.

In addition, the fuel cell system may include a nitrogen tank 200. The nitrogen tank 200 may store nitrogen included in the air supplied to the fuel cell stack 100 and drained through the second drain line 31, and may supply the stored nitrogen to the anode 110 through the hydrogen supply line 11.

The nitrogen tank 200 may include an input valve 210 and an output valve 220. The input valve 210 may allow nitrogen, which is drained through the second drain line 31, to be introduced into the nitrogen tank 200, or block the nitrogen from being introduced into the nitrogen tank 200. The output valve 220 may allow nitrogen, which is stored in the nitrogen tank 200, to be supplied to anode 110 through the hydrogen supply line 11 or may block the nitrogen from being supplied to the anode 110.

According to an embodiment, the input valve 210 and the output valve 220 may be solenoid valves, and a controller 300 may control the opening and the closing of the input valve 210 and the output valve 220 by controlling a PWM or a duty ratio.

Figure 2:
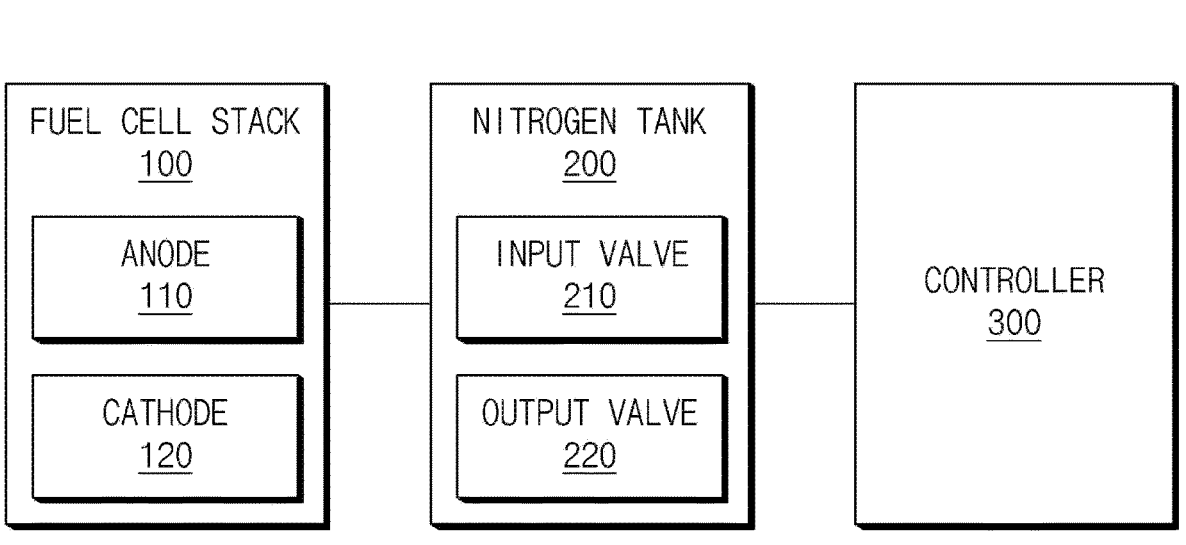
FIG. 2 is a block diagram illustrating a fuel cell system, according to an embodiment of the present disclosure.

FIG. 2 is a block diagram illustrating a fuel cell system, according to an embodiment of the present disclosure.

Referring to FIG. 2, the fuel cell system 1 may include the fuel cell stack 100, the nitrogen tank 200, and the controller 300.

The fuel cell system 1 may store nitrogen, which is drained during or after operation of the fuel cell stack 100, in the nitrogen tank 200, and may supply the stored nitrogen to the anode 110 during the idle period of the fuel cell stack 100 such that the nitrogen is filled in the anode 110, thereby protecting the fuel cell stack 100 and improve the durability of the fuel cell stack 100.

The fuel cell stack 100 may include the anode 110 for receiving hydrogen and the cathode 120 for receiving air. The fuel cell stack 100 may generate electricity by making reaction between the hydrogen of the anode 110 and the air of the cathode 120.

According to an embodiment, the nitrogen tank 200 may store nitrogen drained from the cathode 120, and supply the stored nitrogen to the anode 110. For example, the nitrogen tank 200 may store an entire portion or a portion of nitrogen contained in the air drained from the cathode 120 during operation of the fuel cell stack 100. For another example, the nitrogen tank 200 may drain nitrogen stored during the idle period of the fuel cell stack 100 after terminating the operation of the fuel cell and may supply the nitrogen to the anode 110.

According to an embodiment, the nitrogen tank 200 may include the input valve 210 and the output valve 220.

The input valve 210 may allow nitrogen to be introduced into the nitrogen tank 200, or block the nitrogen from being introduced into the nitrogen tank 200, as the input valve 210 is open or closed. For example, the input valve 210 may allow the nitrogen to be introduced into the nitrogen tank 200 in the state that the input valve 210 is open, and may block the nitrogen from being introduced into the nitrogen tank 200 in the state that the input valve is closed. For example, when the input valve 210 is open, nitrogen contained in the air drained from the cathode 120 to the second drain line 33 may pass through the input valve 210 and be stored in the nitrogen tank 200. The input valve 210 may be positioned on the second drain line 33 or may be interposed between the second drain line 33 and the nitrogen tank 200.

The output valve 220 may allow nitrogen to be drained from the nitrogen tank 200, or block the nitrogen from being drained from the nitrogen tank 200, as the output valve 220 is open or closed. For example, the output valve 220 may allow the nitrogen to be drained from the nitrogen tank 200 in the state that the output valve 220 is open, and may block the nitrogen from being drained from the nitrogen tank 200 in the state that the output valve 220 is closed. For example, when the output valve 220 is open, the anode 110 may receive nitrogen drained from the nitrogen tank 200 through the output valve 220. The output valve 220 may be positioned on the second drain line 11 or may be interposed between the second drain line 11 and the nitrogen tank 200.

According to an embodiment, the controller 300 may be a hardware device, such as a processor, a micro-processor unit (MPU), a micro controller unit (MCU), or a central processing unit (CPU), or an electronic controller unit (ECU), or a program implemented by a processor. The controller 300 may be connected to each component of the fuel cell system 1 to perform an overall function of the thermal management system. For example, the controller 300 may be a fuel cell control unit (FCU) to control the overall functions of the fuel cell system 1.

According to an embodiment, the controller 300 may make wireless or wired communication with a component, such as the fuel cell stack 100 or the nitrogen tank 200 constituting the fuel cell system 1. For example, the controller 300 may make CAN communication with the components.

According to an embodiment, the controller 300 may control to store and supply nitrogen, based on at least one of the pressure and a filling amount of the nitrogen tank 200. The nitrogen tank 200 may include a pressure sensor to sense internal pressure, and the controller 300 may receive the pressure of the nitrogen tank 200 sensed by the pressure sensor. In addition, the controller 300 may obtain a nitrogen filling amount in the nitrogen tank 200 based on the pressure, weight, volume of the nitrogen tank 200. For example, the pressure sensor may include an input pressure sensor to sense pressure in the input valve 210 and an output pressure sensor to sense pressure in the output valve 220, and the controller 300 may obtain pressure in the nitrogen tank 200 based on a sensing value of the input pressure sensor, and obtain the filling amount of the nitrogen tank 200, based on a sensing value of the output pressure sensor. The manner of obtaining the pressure and the filling amount of the nitrogen tank 200 by the controller 300 is provided only for the illustrative purpose, and the present disclosure is not limited thereto.

According to an embodiment, the controller 300 may control to store and supply nitrogen by controlling to open and close the input valve 210 and the output valve 220. For example, when storing nitrogen in the nitrogen tank 200, the controller 300 may control the input valve 210 to be open and the output valve 220 to be closed. For another example, when supplying nitrogen to the anode 110, the controller 300 may control to close the input valve 210 and to open the output valve 220.

According to an embodiment, the controller 300 may control to store the nitrogen into the nitrogen tank 200 when a preset condition is satisfied during the operation of the fuel cell stack 100. The controller 300 may control not to store the nitrogen into the nitrogen tank 200 when the preset condition is not satisfied during the operation of the fuel cell stack 100. The present condition may be set the pressure and the filling amount of the nitrogen tank 200.

According to an embodiment, the preset condition may be varied depending on the operating state of the fuel cell stack 100. For example, the operating state of the fuel cell stack 100 may include a lower-output operating state and a higher-output operating state. In this case, a lower-output operation and a higher-output operation of the fuel cell stack 100 may be classified, depending on for example, the output of the fuel cell stack 100 and a pump RPM of the ACP. For example, the higher-output operating state of the fuel cell stack 100 may indicate that the output of the fuel cell stack 100 exceeds a reference output, and the pump RPM of the ACP exceeds the reference RPM. To the contrary, the lower-output operating state of the fuel cell stack 100 may indicate that the output of the fuel cell stack 100 is equal to or less than the reference output, and the pump RPM of the ACP is equal to or less than the reference RPM. The controller 300 may determine the operating state of the fuel cell stack 100 and may differently apply the preset condition.

According to an embodiment, when the first condition is satisfied during the lower-output operation of the fuel cell stack 100, the controller 300 may control to open the input valve 210 and to close the output valve 220. In other words, when the first condition is satisfied, the controller 300 may control to store the nitrogen in the nitrogen tank 200. In this case, since the output valve 220 is closed, nitrogen is not supplied to the anode 110. In other words, the controller 300 may set the preset condition as the first condition, in the state that the fuel cell stack 100 is in the lower-output operating state.

According to an embodiment, when the first condition is not satisfied during the lower-output operation of the fuel cell stack 100, the controller 300 may control the input valve 210 and the output valve 220 to be closed. In other words, when the first condition is not satisfied, the controller 300 may control not to store the nitrogen in the nitrogen tank 200, and not to supply the nitrogen to the anode 110.

According to an embodiment, the first condition may be at least one of the case that a charging amount of the nitrogen tank 200 is less than a first value, or the case that the pressure of the nitrogen tank 200 is equal to or less than the pressure of the cathode 120. The filling amount of the nitrogen tank 200 less than the first value may refer to that an amount of nitrogen to be supplied to the anode 110 is insufficient, in the situation that the nitrogen is necessary to be supplied to the anode 110 thereafter. In this case, the controller 300 may store the nitrogen to the nitrogen tank 200. In addition, the pressure of the nitrogen tank 200 which is less than or equal to the pressure of the cathode 120, may refer to that nitrogen supplied from the cathode 120 may be further stored in the nitrogen tank 200. In this case, the pressure of the cathode 120 may be the pressure at a point in which the cathode 120 is linked to the second drain line 33, that is, the pressure at an output side of the cathode 120. The first value may be expressed as a proportion of the capacity of the nitrogen tank 200, for example, a value corresponding to an amount of nitrogen required when supplying nitrogen to the anode 110 during the idle period of the fuel cell stack 100. For example, when the capacity of the nitrogen tank 200 is 2 L and when the amount of nitrogen to be supplied to the anode 110 during the idle period of the fuel cell stack 100 is 0.6 L, the first value may be set to 30%.

When the filling amount of the nitrogen tank 200 is less than the first value and nitrogen is introduced into the nitrogen tank 200 (for example, right after the starting of the fuel cell system), nitrogen drained from the cathode 120 may flow to the nitrogen tank 200 and the ACV. In this case, the nitrogen may flow into two branches, so the AEV may be inaccurately controlled. Accordingly, the controller 300 may control the opening rate of the AEV to be lowered to increase the efficiency of storing the nitrogen while enhancing the accuracy in adjusting the pressure of the cathode 120 by controlling the AEV, and then may compensate for the opening rate of the AEV through Feed Forward control. In this case, the opening rate of the AEV may be controlled through PID control.

To the contrast, when the first condition is not satisfied, that is, when the filling amount of the nitrogen tank 200 is equal to or greater than the first value, and when the pressure of the nitrogen tank 200 exceeds the pressure of the cathode 120, the controller 300 may determine that the nitrogen to be supplied to the anode 110 is sufficient. In addition, when the input value 210 is open, the nitrogen may flow back to the second drain line 33 from the nitrogen tank 200. Accordingly, the controller 300 may close the input valve 210 to block the nitrogen from being stored in the nitrogen tank 200.

According to an embodiment, when the second condition is satisfied during the higher-power operation of the fuel cell stack 100, the controller 300 may control to open the input valve 210 and to close the output valve 220. In other words, when the second condition is satisfied, the controller 300 may control to store the nitrogen in the nitrogen tank 200. In this case, since the output valve 220 is closed, nitrogen is not supplied to the anode 110. In other words, the controller 300 may set the preset condition as the second condition, in the state that the fuel cell stack 100 is in the higher-output operating state.

According to an embodiment, when the second condition is not satisfied during the higher-power operation of the fuel cell stack 100, the controller 300 may control to close the input valve 210 and the output valve 220. In other words, when the second condition is not satisfied, the controller 300 may control not to store the nitrogen in the nitrogen tank 200, and not to supply the nitrogen to the anode 110.

According to an embodiment, the second condition may be at least one of the case that a filling amount of the nitrogen tank 200 is less than a second value, or the case that the pressure of the nitrogen tank 200 is equal to or less than the pressure of the cathode 120. In this case, the second value may be set to be greater than the first value. In the higher-power operating state of the fuel cell stack 100, the pressure of the cathode 120 increases because the reaction in the fuel cell stack 100 increases as compared to the lower-power operation state. Accordingly, the filling amount of the nitrogen tank 200 exceeds the first value, in the lower-output operating state of the fuel cell stack 100. Accordingly, even if the input valve 210 is closed, when the fuel cell stack 100 is in the higher-output operating state, the pressure of the cathode 120 is increased, such that nitrogen may be further stored in the nitrogen tank 200. Accordingly, when the fuel cell stack 100 is in the higher-output operating state, and when the filling amount of the nitrogen tank 200 is less than a second value, the controller 300 may open the input valve 210, such that the nitrogen of the nitrogen tank 200 is additionally stored. The second value may be set to, for example, 80% to 100%.

To the contrast, when the second condition is not satisfied, that is, when the filling amount of the nitrogen tank 200 is equal to or greater than the second value, and when the pressure of the nitrogen tank 200 exceeds the pressure of the cathode 120, the controller 300 may determine that the nitrogen to be supplied to the anode 110 is sufficient. In addition, when the input value 210 is open, the nitrogen may flow back to the second drain line 33 from the nitrogen tank 200. Accordingly, the controller 300 may close the input valve 210 to block the nitrogen from being stored in the nitrogen tank 200.

According to an embodiment, the controller 300 may determine whether to additionally store nitrogen in the nitrogen tank 200, depending on the pressure of the nitrogen tank 200 after the operation of the fuel cell stack 100 is finished. That is, the controller 300 may determine whether nitrogen sufficient to be supplied to the anode 110 is stored, based on the pressure of the nitrogen tank 200. For example, when the controller 300 determines that nitrogen should be additionally stored in the nitrogen tank 200, nitrogen drained from the fuel cell stack 100 may be stored in the nitrogen tank 200 during a Code Oxygen Deletion (COD) or Cold Shut Down (CSD) procedure to remove residual hydrogen and oxygen in the fuel cell stack 100 after operation of the fuel cell stack 100 is finished.

For example, when the pressure of the nitrogen tank 200 is less than a third value, the controller 300 may determine that nitrogen needs to be stored in the nitrogen tank 200, and may control to open the input valve 210 and to close the output valve 220. In addition, when the pressure of the nitrogen tank 200 is higher than the third value, the controller 300 may determine that the nitrogen needs not to be stored in the nitrogen tank 200, and may control to close the input valve 210 and the output valve 220.

The third value may be a preset value, and may be a pressure value when nitrogen is stored at a specific proportion of the capacity of the nitrogen tank 200. For example, the third value may be a pressure value corresponding to 60% of the capacity of the nitrogen tank 200.

According to an embodiment, the controller 300 may control to open the output valve 220, when a first time is elapsed after the operation of the fuel cell stack 100 is finished, and the input valve 210 is closed. In this case, a time point after the operation of the fuel cell stack 100 is finished and a time point at which the input valve 210 is closed may refer to the time point at which both cases of the operation of the fuel cell stack 100 finished and the input valve 210 closed are satisfied. For example, when the input valve 210 is open during the COD or CSD procedure, as the pressure of the nitrogen tank 200 is less than the third value after the operation of the stack 100 is finished, the time point at which the operation of the fuel cell stack 100 is finished and the input valve 210 is closed may be a time point at which the input valve 210 is closed, as the COD or CSD procedure is finished or the pressure of the nitrogen tank is equal to or greater than the third value.

The first time may be preset, and may be restarted after the operation of the fuel cell stack 100 is completed, and a sufficient time is required. For example, the first time may be set to 5 minutes.

According to an embodiment, the controller 300 may control to close the output valve 220 and enter into a power saving mode, when the pressure drop in the nitrogen tank 200 is stopped. In other words, when the pressure drop in the nitrogen tank 200 is stopped in the state that nitrogen is supplied to the anode 110 by opening the output valve 220, the controller 300 determines that nitrogen is sufficiently supplied to the anode 110. The supply of nitrogen may be stopped by closing the output valve 220. In this case, that the pressure drop in the nitrogen tank 200 is stopped may refer to that the pressure of the anode 110 and the pressure of the nitrogen tank 200 are balanced. In addition, when the controller 300 closes the output valve 220 as the pressure drop in the nitrogen tank 200 is stopped, the controller 300 may enter into the power saving mode, because the input valve 210 and/or the output valve 220 do not need to be controlled in a shorter time during the idle period of the fuel cell system 1.

According to an embodiment, the controller 300 may control to open the output valve 220, when a second time is elapsed without operating the fuel cell stack 100, after entering into the power saving mode. The pressure in the anode 110 may be lowered due to the diffusion of nitrogen, when the idle period of the fuel cell system 1 is continued, after entering into the power saving mode. Accordingly, the controller 300 may control to open the output valve 220 to resupply nitrogen. In this case, even the supply of a slight amount of nitrogen is sufficient. Accordingly, the controller 300 may control to reduce the opening rate and/or the opening time of the output valve 220. In this case, the idle state of the fuel cell system 1 may refer to the state in which the controller 300 enters into the power saving mode and the fuel cell stack 100 is not operated.

Figure 3A:
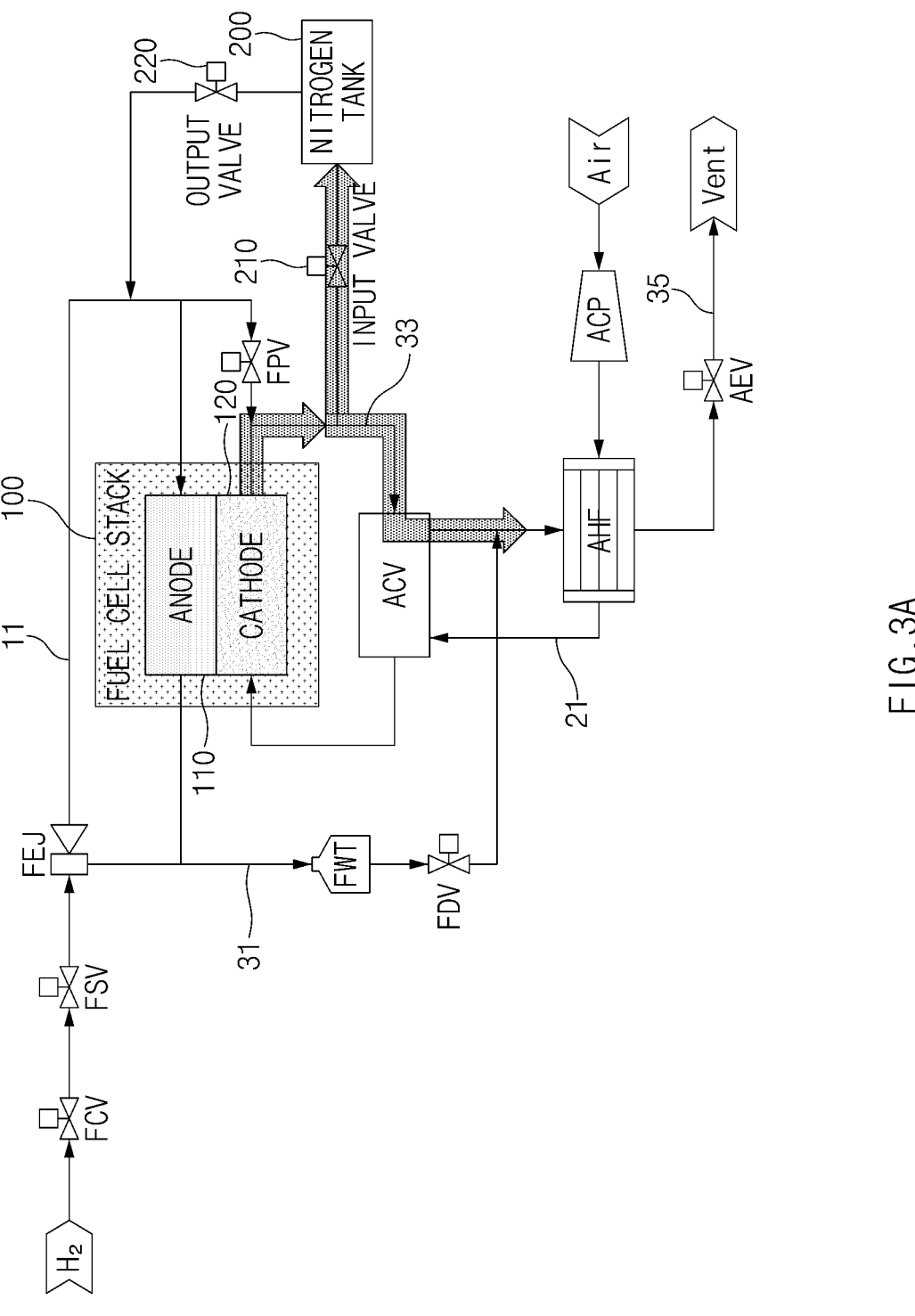
FIG. 3A is a view illustrating a movement path of nitrogen, when nitrogen is stored in a nitrogen tank, according to an embodiment of the present disclosure.
Figure 3B:
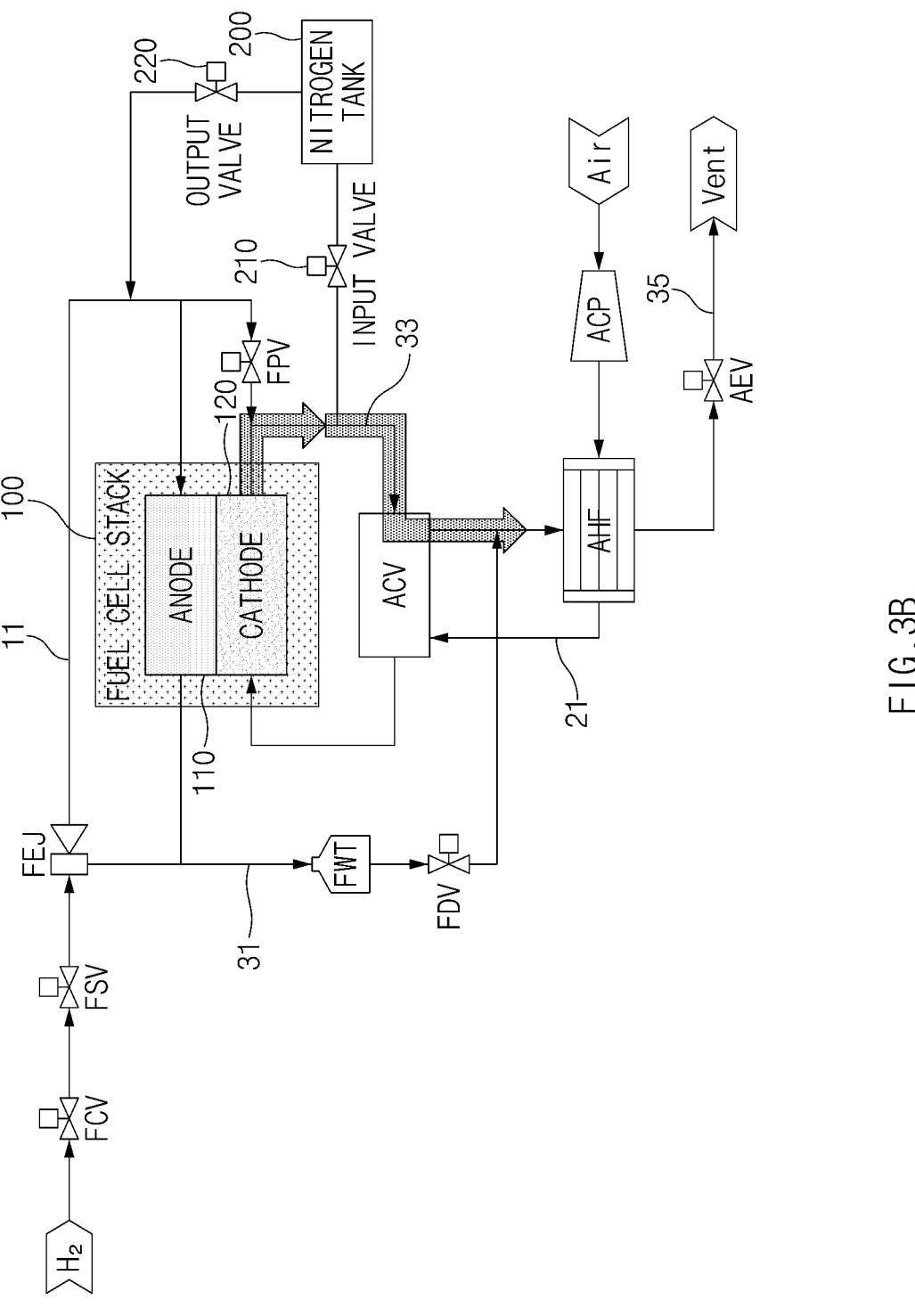
FIG. 3B is a view illustrating a movement path of nitrogen when nitrogen is not stored in a nitrogen tank, according to an embodiment of the present disclosure.
Figure 3C:
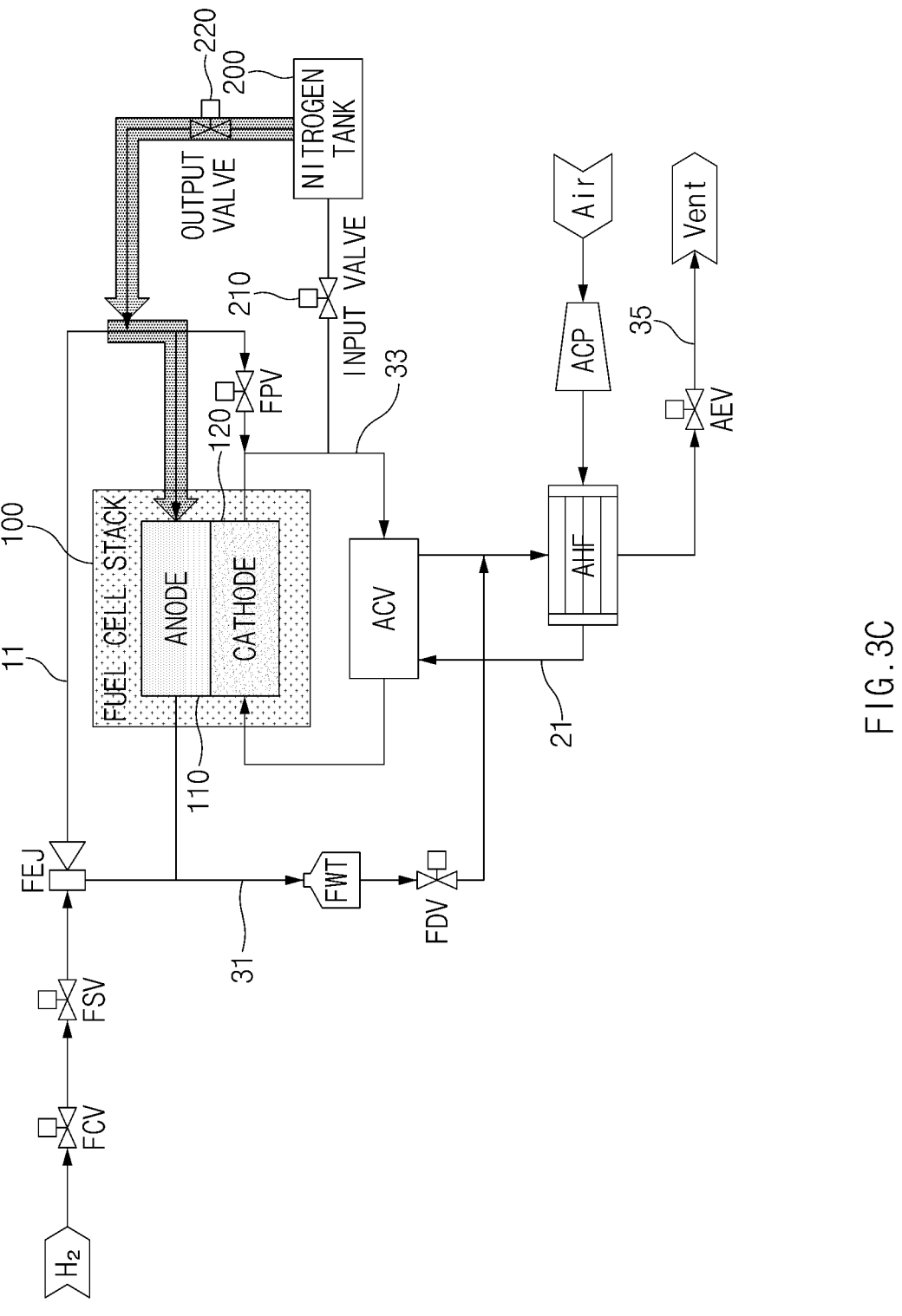
FIG. 3C is a view illustrating a movement path of nitrogen when nitrogen is supplied to an anode, according to an embodiment of the present disclosure.

FIG. 3A is a view illustrating a movement path of nitrogen, when nitrogen is stored in a nitrogen tank, according to an embodiment of the present disclosure. FIG. 3B is a view illustrating a movement path of nitrogen when nitrogen is not stored in a nitrogen tank, according to an embodiment of the present disclosure. FIG. 3C is a view illustrating a movement path of nitrogen when nitrogen is supplied to an anode, according to an embodiment of the present disclosure.

Referring to FIG. 3A, when nitrogen is stored in the nitrogen tank 200, the input valve 210 may be open. Accordingly, a portion of nitrogen drained from the cathode 120 to the second drain line 33 may be introduced into the nitrogen tank 200 through the input valve 210.

Referring to FIG. 3B, when nitrogen is not stored in the nitrogen tank 200, the input valve 210 may be closed. Accordingly, nitrogen drained from the cathode 120 may not be introduced into the nitrogen tank 200 and may flow to the ACV along the second drain line 33.

Referring to FIG. 3C, when nitrogen is supplied to the anode 110, the output valve 220 may be open. Accordingly, nitrogen drained from the nitrogen tank 200 may be introduced into the anode 110 along the hydrogen supply line 11 through the output valve 220.

Figure 4:
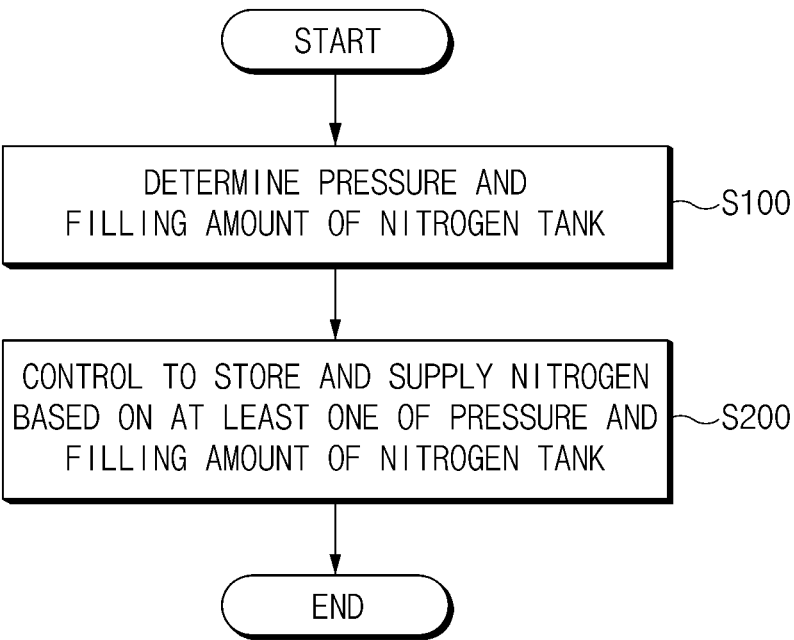
FIG. 4 is a flowchart illustrating a control method of a fuel cell system, according to an embodiment of the present disclosure.

FIG. 4 is a flowchart illustrating a control method of a fuel cell system, according to an embodiment of the present disclosure.

Figure 5:
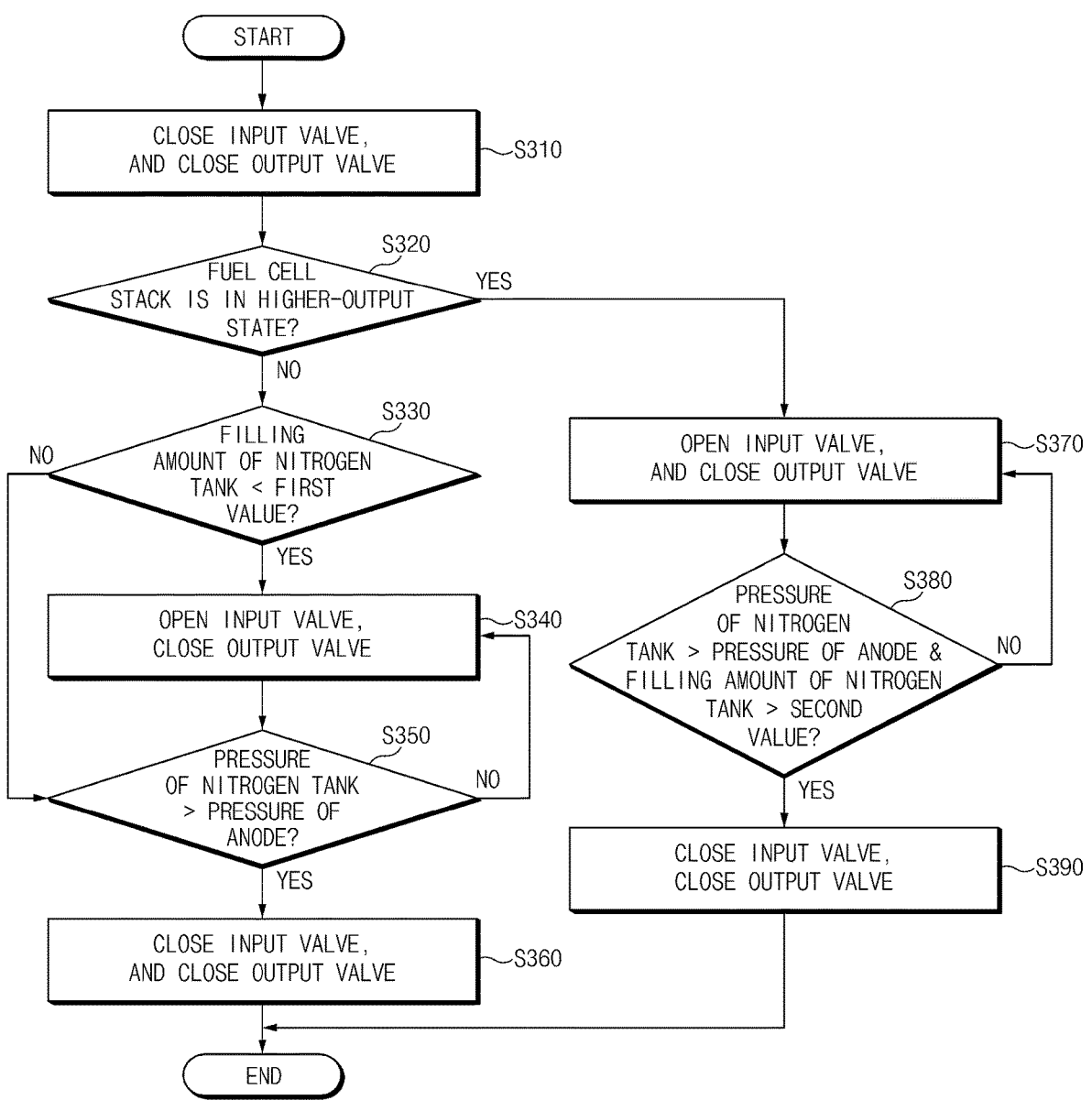
FIG. 5 is a flowchart illustrating a control procedure during the operation of a fuel cell system, according to an embodiment of the present disclosure.
Figure 6:
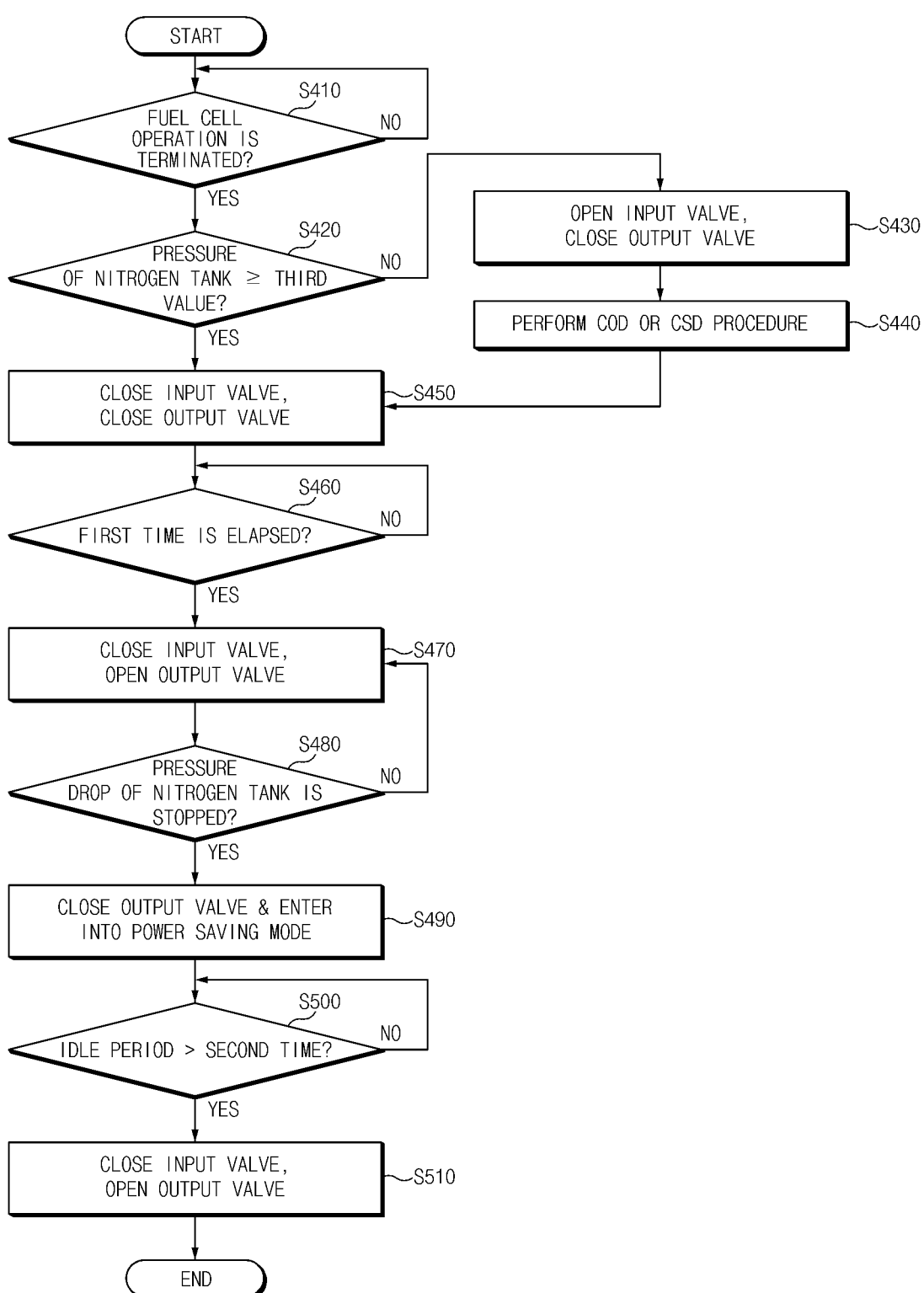
FIG. 6 is a flowchart illustrating a control procedure after the operation of the fuel cell system is finished, according to an embodiment of the present disclosure.

Embodiments provided in FIGS. 4 to 6 are provided only for the illustrative purpose. The sequence of steps according to various embodiments of the present disclosure may be different from the illustrated sequence. For example, some steps illustrated in FIGS. 4 to 6 may be omitted, the sequence between the steps may be changed, and the steps may be merged.

Referring to FIG. 4, the control method of the fuel cell system may include determining the pressure and the filling amount of the nitrogen tank (S100) and controlling to store and supply nitrogen based on at least one of the pressure and the filling amount of the nitrogen tank (S200).

In S100, the controller 300 may determine the pressure and the filling amount of the nitrogen tank 200. To this end, the nitrogen tank 200 may include the pressure sensor.

In S200, the controller 300 may control to store and supply nitrogen, based on at least one of the pressure and an filling amount of the nitrogen tank 200. As the controller 300 controls to store and supply nitrogen, nitrogen drained during the operation of the fuel cell stack 100 and/or after terminating the operation of the fuel cell stack 100 may be stored in the nitrogen tank 200. In addition, the stored nitrogen may be supplied to the anode 110 during the idle period of the fuel cell stack 100, thereby protecting the fuel cell stack 100 and improving the durability of the fuel cell stack 100.

FIG. 5 is a flowchart illustrating a control procedure during the operation of the fuel cell system, according to an embodiment of the present disclosure.

In S310, the controller 300 may close the input valve 210 and the output valve 220. Starting may refer to the stating of the fuel cell stack 100, and the controller 300 may close the states of the input valve 210 and the output valve 220 in default.

In S320, the controller 300 may determine whether the output of the fuel cell stack 100 is higher. In other words, the controller 300 may determine whether the operating state of the fuel cell stack 100 is a higher-operating state. When the output of the fuel cell stack 100 is higher (S320—Yes), the controller 300 may proceed to S370. The controller 300 may proceed to S330 when the output of the fuel cell stack 100 is not higher (when the output of the fuel cell stack 100 is lower) (S320—No).

In S330, the controller 300 may determine whether the filling amount of the nitrogen tank 200 is less than the first value. When the filling amount of the nitrogen tank 200 is less than the first value (S330—Yes), the controller 300 may proceed to S340. When the filling amount of the nitrogen tank 200 is greater than or equal to the first value (S330—No), the controller 300 may proceed to S350.

In S340, the controller 300 may control to open the input valve 210 and to close the output valve 220.

In S350, the controller 300 may determine whether the pressure of the nitrogen tank 200 exceeds the pressure of the cathode. When the pressure of the nitrogen tank 200 exceeds the pressure of the cathode (S350—Yes), the controller 300 may proceed to S360. When the pressure of the nitrogen tank 200 is less than or equal to the pressure of the cathode (S350—No), the controller 300 may proceed to S340.

In S360, the controller 300 may control to close the input valve 210 and the output valve 220.

In S370, the controller 300 may control to open the input valve 210 and to close the output valve 220.

In S380, the controller 300 may determine whether the pressure of the nitrogen tank 200 exceeds the pressure of the cathode, and the filling amount of the nitrogen tank 200 exceeds the second value. In other words, the controller 300 may determine whether the second condition is satisfied, in the state that the fuel cell stack 100 is in the higher-output operating state. The controller 300 may proceed to S390, when the second condition is not satisfied (S380-Yes). The controller 300 may proceed to S370, when the second condition is satisfied (S380-No).

In S390, the controller 300 may control to close the input valve 210 and to close the output valve 220.

FIG. 6 is a flowchart illustrating a control procedure after the operation of the fuel cell system, according to an embodiment of the present disclosure.

In S410, the controller 300 may determine whether to terminate the operation of the fuel cell stack 100. The controller 300 may proceed to S420 when the operation of the fuel cell stack 100 is terminated (S410-Yes).

In S420, the controller 300 may determine whether the pressure of the nitrogen tank 200 is less than the third value. When the pressure of the nitrogen tank 200 is greater than or equal to the third value (S420—Yes), the controller 300 may proceed to S450. When the pressure of the nitrogen tank 200 is less than the third value (S420—No), the controller 300 may proceed to S430.

In S430, the controller 300 may control to open the input valve 210 and to close the output valve 220.

In S440, the controller 300 may perform the COD or CSD procedure in the fuel cell stack 100.

In S450, the controller 300 may control to close the input valve 210 and to close the output valve 220.

In S460, the controller 300 may determine whether the first time is elapsed, after the operation of the fuel cell stack 100 is terminated and after the input valve 210 is closed. When the first time is elapsed (S460-Yes), the controller 300 may proceed to S470.

In S470, the controller 300 may control to close the input valve 210 and to open the output valve 220. Accordingly, the controller 300 may supply nitrogen stored in the nitrogen tank 200 to the anode 110.

In S480, the controller 300 may determine whether the pressure drop of the nitrogen tank 200 is stopped. When the pressure drop of the nitrogen tank 200 is stopped (S480—Yes), the controller 300 may proceed to S490. When the pressure drop of the nitrogen tank 200 is not stopped (S480—No), the controller 300 may proceed to S470.

In S490, the controller 300 may control to close the output valve 220 and to enter into the power saving mode.

In S500, the controller 300 may determine whether the idle period of the fuel cell stack 100 exceeds a second time. In this case, the idle period of the fuel cell stack 100 may refer to the time in which the controller 300 enters into the power saving mode and the fuel cell stack 100 is not operated.

In S510, the controller 300 may control to close the input valve 210 and to open the output valve 220.

According to an embodiment of the present disclosure, the fuel cell system may store nitrogen, which is drained from the fuel cell stack, into a nitrogen tank, and supply the stored nitrogen to the anode during the idle period of the fuel cell stack to be filled in the anode, thereby protecting the fuel cell stack such that the durability is improved.

According to an embodiment of the present disclosure, the fuel cell system removes hydrogen and oxygen remaining in the fuel cell stack through a cathode oxygen depletion procedure or a cold shut down (CSD) procedure after terminating the operation thereof. In this case, after performing the procedure, residual oxygen of a cathode is returned to an anode due to the difference in pressure during an idle period of the fuel cell stack and makes reaction, thereby exerting an influence on the durability of the fuel cell stack.

According to an embodiment of the present disclosure, nitrogen, which does not make chemical reaction in the stack, is filled in the anode during storing the fuel cell stack, thereby preventing oxygen from being introduced into the anode from the cathode. In addition, the reaction is prevented to protect the stack.

The computing apparatuses, the electronic devices, the processors, the memories, and other components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A fuel cell system comprising:
a fuel cell stack comprising an anode and a cathode;
a nitrogen tank configured to store nitrogen drained from the cathode, and to supply the stored nitrogen to the anode; and
a controller configured to control the storing of the nitrogen and the supplying of the nitrogen, based on one or more of a pressure and a filling amount of the nitrogen tank,
wherein the controller is configured to store the nitrogen into the nitrogen tank based on a preset condition being satisfied,
wherein the preset condition is varied corresponding to operating state of the fuel cell stack,
wherein the operating state of the fuel cell stack is a lower-output operating state and a higher-output operating state.

2. The fuel cell system of claim 1, wherein the nitrogen tank comprises an input valve and an output valve, and
wherein the controller is further configured to control opening or closing of the input valve and the output valve to control the storing and the supplying of the nitrogen.

3. The fuel cell system of claim 2, wherein the controller is further configured to open the input valve and to close the output valve, in response to a first condition being satisfied during the lower-output operation of the fuel cell stack, and to close the input valve and the output valve, in response to the first condition not being satisfied.

4. The fuel cell system of claim 3, wherein the first condition is at least one of the filling amount of the nitrogen tank being less than a first value, or the pressure of the nitrogen tank being equal to or less than a pressure of the cathode.

5. The fuel cell system of claim 4, wherein the controller is further configured to:
open the input valve and close the output valve, in response to a second condition being satisfied during the higher-output operating state of the fuel cell stack; and
close the input valve and the output valve, in response to the second condition not being satisfied.

6. The fuel cell system of claim 5, wherein the second condition is at least one of the filling amount of the nitrogen tank being less than a second value, or the pressure of the nitrogen tank being equal to or less than the pressure of the cathode.

7. The fuel cell system of claim 2, wherein the controller is further configured to:
open the input valve and close the output valve, in response to the pressure of the nitrogen tank being less than a third value after an operation of the fuel cell stack is terminated; and
close the input valve and the output valve, in response to the pressure of the nitrogen tank being equal to or greater than the third value.

8. The fuel cell system of claim 7, wherein the controller is further configured to:
open the output valve, in response to a first time elapsing after the operation of the fuel cell stack is terminated and after the input valve is closed.

9. The fuel cell system of claim 8, wherein the controller is further configured to control to close the output valve and to enter into a power saving mode, in response to a pressure drop of the nitrogen tank being stopped.

10. The fuel cell system of claim 9, wherein the controller is further configured to
open the output valve, in response to a second time being elapsed without the operation of the fuel cell stack, after entering into the power saving mode.

11. A processor-implemented method of controlling a fuel cell system including a fuel cell stack comprising an anode and a cathode, the method comprising:
storing nitrogen drained from the cathode in a nitrogen tank, and supplying the stored nitrogen to the anode;
determining pressure and a filling amount of the nitrogen tank; and
controlling the storing and the supplying of the nitrogen, based on one or more of the pressure and the filling amount of the nitrogen tank,
wherein the controlling the storing the nitrogen includes storing the nitrogen into the nitrogen tank based on a preset condition being satisfied,
wherein the preset condition is varied corresponding to operating state of the fuel cell stack,
wherein the operating state of the fuel cell stack is a lower-output operating state and a higher-output operating state.

12. The control method of claim 11, wherein the nitrogen tank comprises an input valve and an output valve, and
wherein the controlling of the storing and the supplying of the nitrogen comprises controlling opening and closing of the input valve and the output valve to control the
storing and the supplying of the nitrogen.

* * * * *